F. L. EIDMANN.
ELEVATING TRUCK.
APPLICATION FILED AUG. 4, 1919.
1,415,926.
Patented May 16, 1922.
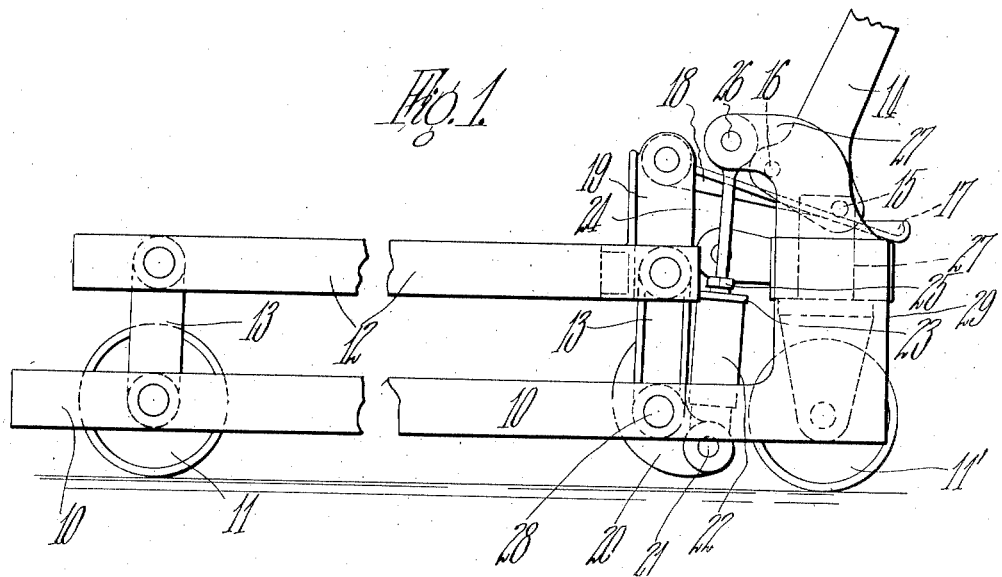
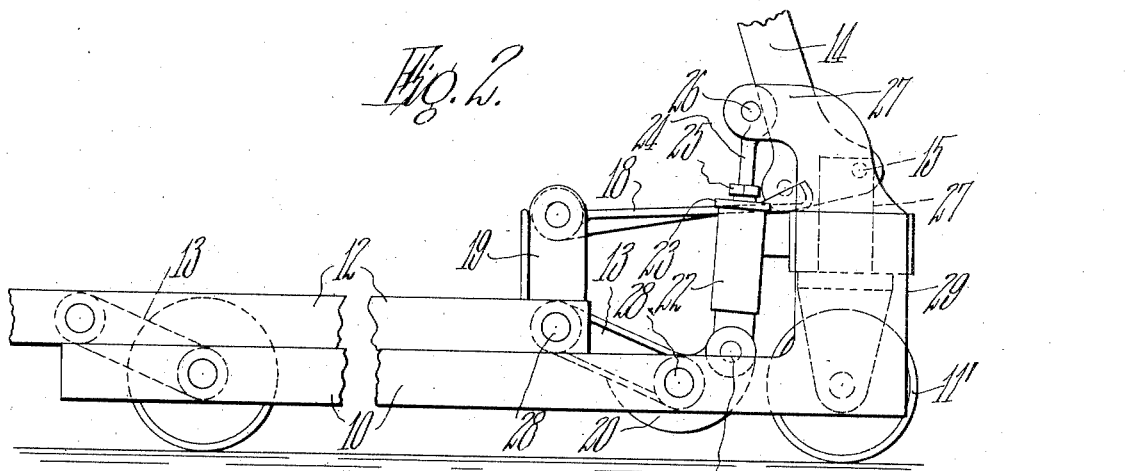
INVENTOR
Frank L. Eidmann.
BY Chapin & Neal.
ATTORNEYS.

UNITED STATES PATENT OFFICE.

FRANK L. EIDMANN, OF HOLYOKE, MASSACHUSETTS, ASSIGNOR TO J. LEWIS WYCKOFF, EDWARD N. WHITE, AND GEORGE F. JENKS, ALL OF HOLYOKE, MASSACHUSETTS, TRUSTEES, DOING BUSINESS AS COWAN TRUCK COMPANY.

ELEVATING TRUCK.

1,415,926.  Specification of Letters Patent.  Patented May 16, 1922.

Application filed August 4, 1919. Serial No. 315,287.

*To all whom it may concern:*

Be it known that I, FRANK L. EIDMANN, a citizen of the United States of America, residing at Holyoke, in the county of Hampden and State of Massachusetts, have invented certain new and useful Improvements in Elevating Trucks, of which the following is a specification.

My invention relates to elevating trucks and specifically to means for lowering the platform of the truck from its elevated position without shock, known as a platform checking mechanism.

It has for its object the improvement of similar trucks in points of compactness and convenience of operation. It has for a further object the location of the platform checking mechanism in a position where it will not be injured by careless loading of the truck, and where any leakage of oil from it will be avoided.

To these and other ends, which will be apparent from the ensuing description and the appended claims, my improved truck is constructed in part as is shown in the accompanying drawings, in which—

Fig. 1 is a side elevation of a truck embodying my improvements, with the platform in elevated position, various elements being omitted to more clearly emphasize the features of novelty;

Fig. 2 is a similar view with the platform in lowered position.

The truck shown, is of the usual type comprising a base frame 10 supported upon rear wheels 11, and front steering wheel 11′, and an elevating platform 12 carried by links 13 pivoted to both the platform and the base frame. In order to raise the platform, any suitable type of elevating means may be used. In the embodiment shown, a steering handle 14, pivoted at 15 to the swivelled head of the wheel fork 27 carrying the front wheel, has a pin 16 adapted to engage a hook 17 on a link 18 which in turn is connected to an upstanding part 19 of the elevating platform. By swinging the handle forwardly and downwardly, the elevating platform is raised, and may be locked in that position by any suitable means (not shown). The handle is then disengaged from link 18 so that the former may readily be used in moving the truck.

In order to lower the elevating platform from its raised position two general types of construction have been proposed; first, a re-engagement of the handle with the link 18 coupled with a release of the locking means, the lowering of the platform being governed by the handle; and second, a mere release of the locking means, accompanied by a kicking back of the platform to swing the links off center, the lowering of the platform being controlled by a separate checking device usually in the nature of a dash pot or hydraulic check. It is to the second type that my invention relates. My improved construction will now be described in detail.

One of the platform supporting links 13 is formed with a crank arm extension 20 at the other side of its pivot 28. To this extension 20, is pivoted as at 21, the lower end of the cylinder 22 of a dash pot or hydraulic check. A cap 23 is secured to the upper end of the cylinder and a piston rod 24 passes through a stuffing-box 25 in the cap. The upper end of the piston-rod is pivoted at 26 to a bracket 27 forming part of the front head 29 of the base frame 10.

When the platform descends from its elevated position of Fig. 1 to that of Fig. 2, the crank arm 20 telescopes the cylinder and piston of the checking mechanism, which parts freely accommodate themselves to the movement without binding due to their pivotal connections at the ends. By making the crank arm 20 substantially shorter than the link 13 a considerable shortening of the stroke in the telescoping members of the checking device is effected with a resulting compactness in structure.

I am aware that dash pots or hydraulic checks have previously been used in elevating trucks for similar purposes, but these prior devices usually have had the dash pot arranged substantially horizontally, with their piston rod extending the full length of the machine. This construction was objectionable for the reasons that the dash pot and its piston rod were located in an exposed position, between the side bars of the platform and therefore liable to frequent breakage due to improper loading of the truck; and that the horizontal position of the dash pot tended to cause leakage of the contained fluid through the stuffing box, with consequent dripping upon the floor and loss of the contents of the dash pot. This construction was also objectionable for its lack of compactness.

In my improved construction, the check is connected between a bracket on the head of the base frame and one of the swinging links forming the parallel motion for the elevating platform. This prevents any interference with the motion of the elevating mechanism, and permits of a very compact arrangement, the length of stroke of the dash pot being preferably less than the movement of the platform. The check is mounted in the machine right side up, avoiding leakage and any such irregular wearing of the stuffing box as will occur where the check is mounted in a substantially horizontal position.

I realize that various minor changes can be made in the details of my invention without departing from the spirit thereof, and I do not wish to be limited to the exact form shown except as signified in the accompanying claims. For example, the pivot 21 might be located in a different position on the link, or, instead of the dash pot being connected to by one link only, it might be operated by the motion of the two forward links.

I claim—

1. In an elevating truck, a base frame, having a head extending upwardly therefrom, an elevating platform movable up and down on said base, an arm pivoted on said base and connected to swing with the up and down movement of said platform, and a vertically disposed checking mechanism connected between said swinging arm and the head for controlling the descent of said platform.

2. In an elevating truck, a base frame having a head, an elevating platform mounted for up and down movement on said base, a swinging link pivoted between the base frame and the platform, an arm secured to said link of shorter length than the link itself, and a checking mechanism for controlling the descent of said platform interposed between the head and the arm.

3. In an elevating truck, a base frame, an elevating platform, a swinging link pivoted between the base frame and the platform, an arm secured to said link of shorter length than the link itself, and a checking mechanism interposed between the base frame and the arm comprising a cylinder and a reciprocating piston therein, one of said two last named elements being attached to said arm and the other to said base frame.

4. In an elevating truck, a base frame, an elevating platform supported from the base frame by a plurality of parallel links, and a checking mechanism mounted between the base frame and one of said links, the point of attachment of said checking mechanism to the link being separate from the pivot point of the link.

5. In an elevating truck, a base frame, an elevating platform, a link pivoted to both the base frame and the platform and having a portion extending beyond the point of its pivotal connection to the base frame, and a checking mechanism interposed between the base frame and the extended portion of said link.

6. In an elevating truck, a base frame, an elevating platform, a plurality of links pivoted to both the frame and the platform, an upright head at the forward end of said base frame, and a checking mechanism connected between the head and one of said links.

FRANK L. EIDMANN.